Sept. 18, 1962
T. G. CRAWFORD
3,054,428
COMPOSITE LAMINATED TUBULAR MEMBER
Filed Oct. 22, 1959
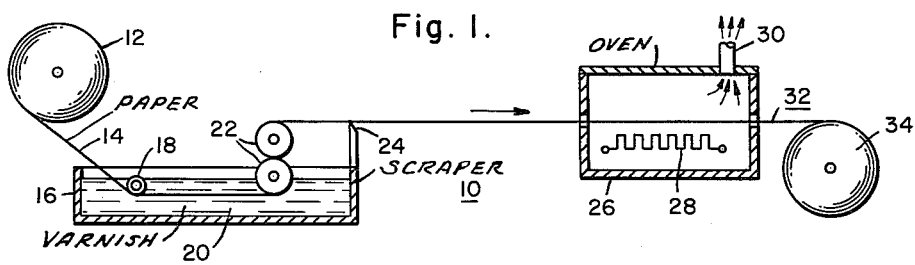
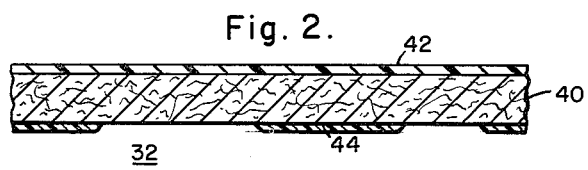
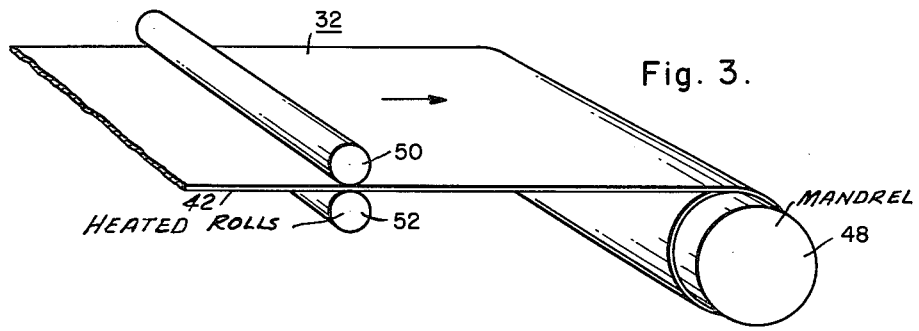
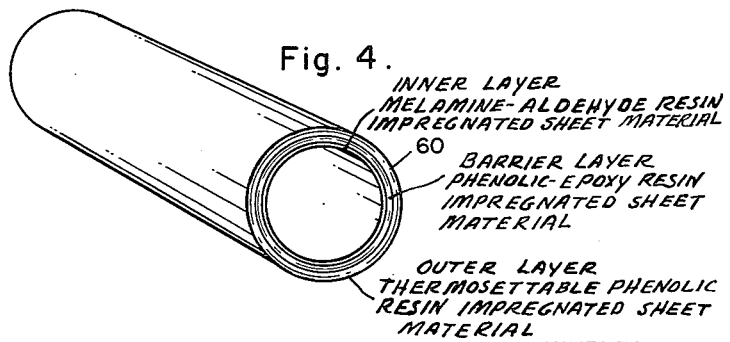
WITNESSES
INVENTOR
Thomas G. Crawford.
BY
ATTORNEY

United States Patent Office 3,054,428
Patented Sept. 18, 1962

3,054,428
COMPOSITE LAMINATED TUBULAR MEMBER
Thomas G. Crawford, Varnville, S. C., assignor to Westinghouse Electric Corporation, East Pittsburgh, Pa., a corporation of Pennsylvania
Filed Oct. 22, 1959, Ser. No. 847,940
2 Claims. (Cl. 138—141)

This invention relates to composite laminated tubular members, and particularly to composite laminated tubular members adapted for use as bobbin barrels in the manufacture of bobbins.

It is a practice to make draw winder bobbins from a laminated tubular member composed of rolled sheet fibrous material impregnated with a phenolic resin. When employed with some of the recent synthetic fibers such as nylon, it has been found necessary to employ laminated tubular members having high strength in order to withstand the high tensions developed during drawing.

This invention is directed to high strength laminated tubular members for use as barrels in the manufacture of bobbins, pirns and like members. Furthermore, this invention is directed to a composite laminated tubular member which can be easily identified so that the ownership of bobbins prepared therefrom can be determined readily.

For a complete understanding of this invention, reference is made to the following detailed description and drawing, in which:

FIGURE 1 is a view in elevation, partly in section of apparatus for impregnating fibrouse sheet material with a resinous varnish;

FIG. 2 is an enlarged fragmentary cross-section through a sheet of paper impregnated with B-stage resin;

FIG. 3 is a view in perspective of a tube being rolled; and,

FIG. 4 is a view in perspective of a finished tube.

In accordance with this invention, there is prepared a composite laminated tubular member having high strength and low weight, which tubular member is particularly suited for use as a bobbin barrel in the manufacture of bobbins for use in the textile industry. Furthermore, in accordance with this invention, the composite laminated tubular member is provided with identification features so that ownership of bobbins prepared therefrom can be determined.

The composite laminated tubular members of this invention are comprised of (1) an inner or identification layer, comprised of fibrous sheet material and a selected thermoset resin, (2) an intermediate or barrier layer comprised of a plurality of wrappings or plies of fibrous sheet material and a specific thermoset resinous composition, and (3) an outer or surface layer comprised of a plurality of wrappings or plies of fibrous sheet material and a specific thermoset phenolic resin.

The inner layer (1) of the composite tubular member of this invention is the layer that carries the identifiable feature which will enable textile manufacturers to determine the source of a bobbin prepared therefrom and particularly the ownership thereof. The identification feature of the composite laminated tubular members of this invention is particularly important to the textile manufacturer in cases where the supplier of the yarn used by the textile manufacturer provides credit for the return of bobbins. Thus, it will be apparent that the inner layer or identification layer is an important aspect of this invention.

The inner layer can comprise a sheet of alpha-cellulose paper, thin cotton fabric, glass fabric, asbestos paper, kraft paper, or an equivalent strong fibrous sheet material. The sheet material employed has a design or some identifiable feature, such as the name of the yarn manufacturer imprinted thereon. For the purposes of this invention, it is preferred to employ as the fibrous sheet material kraft paper which has been pigmented throughout and which has imprinted thereon in bold contrasting letters the name or other identification required by the bobbin owner to insure adequate identification thereof. A particularly suitable material is bleached kraft paper that has been pigmented throughout with titanium dioxide and which has imprinted thereon in bold contrasting lettering, black or dark blue lettering for example, the name of the bobbin owner.

The resin impregnant employed in preparing the inner layer of the composite tubular member of this invention is a clear plasticized melamine-aldehyde resin. Melamine-aldehyde resins are well known in the art as the condensation product of melamine and an aldehyde, such as formaldehyde. In many cases, the melamine-formaldehyde resins are made in the presence of butanol and comprise butylated polymers. Various plasticized melamine-aldehyde resins are known in the art. For the purposes of this invention, it is preferred to employ as the impregnant for the fibrous sheet material of the inner layer of the composite tubular member a melamine-formaldehyde resin that has been plasticized with from about 10% to 30% by weight based upon the weight of the melamine-aldehyde resin of para- and/or ortho-toluenesulfonamide.

The following example is illustrative of a method of preparing a plasticized melamine-aldehyde resin for use in this invention. All parts are by weight.

*Example I*

One hundred twenty-six parts of melamine, 200 parts of 37% formaldehyde and 38.3 parts of toluenesulfonamide (40/60 ortho, para ratio) are charged into a reaction vessel equipped with agitator and reflux column. The pH of the admixture is adjusted to from about 9.0 to 9.8. The admixture is then heated by the application of external heat to a temperature of about 60° C. in about 15 minutes and maintained at this temperature for about 1 hour. A clear solution is produced which is spray dried by conventional methods to yield a finely divided white powder.

This finely divided white powder is then dissolved in a suitable solvent such, for example, as methanol, ethanol, acetone, methyl ethyl ketone, xylene, toluene or mixtures of two or more to provide an impregnating resinous varnish composition having a resin solids content of about 50%.

Referring to FIG. 1 of the drawing there is illustrated apparatus 10 for the treatment of fibrous sheet material with a a resinous varnish composition. A roll 12 comprising a sheet of fibrous sheet material 14 is disposed at one end of apparatus 10. For the purposes of preparing impregnated fibrous sheet material for use in preparing the inner layer of the composite tubular member of this invention the roll 12 comprises the preferred pigmented bleached kraft paper having imprinted thereon the desired identification. The paper 14 is drawn from the roll 12 and passes into a varnish dip pan 16 beneath a roller 18 immersed in varnish composition 20, which in this instance is the plasticized melamine-aldehyde resin varnish above described, so that the paper 14 is soaked in the varnish. The paper is withdrawn from the varnish 20 and passes between a pair of squeeze rolls 22 where the amount of applied varnish is controlled by the setting of the rolls. The bottom side of the strip of treated paper is preferably finally drawn over a scraper 24 so as to remove any adhering superficial resin from that one side of the paper. The strip of paper with the applied varnish then passes into an oven 26 having electrical heating element 28 or other suitable heating means where the solvent from the resin varnish is evaporated. Solvent vapors escape through the stack 30 from the oven. The product 32 coming from the oven comprises treated paper carrying B-stage resin, and may be wound into a roll 34 for storage, or may be cut to shape at once or otherwise handled.

The heat treatment is carried out in oven 26 so as to provide a treated sheet of paper with a greenness of from about 3.5% to 7%. The greenness is determined by placing a stack of small pieces of the resin treated paper in a hot press and pressing the stack at a temperature of 175° C. and a pressure of 1000 pounds per square inch for 5 minutes, and then weighing the amount of resin that is forced out of the stack, that is, the resin that extends beyond the paper sheets proper and determining the proportion of the exuded resin to the total weight of the samples.

As illustrated in the enlarged cross-section of FIG. 2 the treated sheet 32 comprises a body 40 completely impregnated with resin in the B-stage and carrying on its upper surface a thin surface layer 42 of resin while the bottom surface 44 of the sheet is substantially free from any superficial resin. There is present on the surface 44, however, a very small amount of the resin, it not being practical to remove all of the resin with scraper 24.

The sheet 32 is impregnated, to a resin ratio of from about 2.0 to 2.2. Resin ratio is defined as the weight of the sheet plus the weight of the resin to the weight of the untreated sheet. Thus, the sheet 32 comprises resin in the amount of from 100% to 120% of the weight of the sheet.

The intermediate layer, or barrier layer, of the composite laminated tubular member of this invention is prepared from fibrous sheet material such as kraft paper, asbestos paper, alpha-cellulose paper, absorbent sulphite paper or an equivalent strong paper impregnated with a specific phenolic-epoxy resin composition which will be detailed more fully hereinafter. Woven fabrics such as cotton cloth, glass cloth, nylon cloth and the like can be used if desired.

The preferred resinous impregnant employed in preparing the inner layer or barrier layer of the composite tubular member of this invention comprises (a) from 98% to 88% by weight of a thermosettable phenolic resin and (b) from 2% to 12% by weight of a glycidyl polyether or epoxide resin, also known as epoxy resin. A volatile organic solvent is employed in admixture with (a) and (b) to provide an impregnating varnish composition. Suitable solvents are methanol, ethanol, xylene, toluene and mixtures of two or more. The fibrous sheet material is impregnated to a resin ratio of from about 2.1 to 2.3 with the impregnating varnish composition in the manner hereinbefore described with reference to FIG. 1 of the drawing, and the volatile solvent removed. The volatile solvent is removed by the application of heat in the manner hereinbefore described. The heat treatment for the solvent removal is carried out so as to provide the treated sheet of absorbent sulphite paper with a greenness of from about 3% to 8%, a greenness of 4% to 6% being the preferred range. The greenness is determined as hereinbefore described.

The phenolic resin (a) can be a conventional thermosettable, laminating-type phenolic resin having a moderate greenness prepared by reacting phenol, cresol, or cresylic acid with formaldehyde, paraformaldehyde, or other polymers of formaldehyde which are well known in the art. Other aldehydes can be employed if desired. Examples of other suitable aldehydes are acetaldehyde, propionaldehyde, butyraldehyde and benzaldehyde. As is well known in the art, cresylic acid comprises a mixture of varying composition of cresols and xylenols. However, exceptionally good results are obtained by using a phenolic resin prepared by reacting one mol of phenol (hydroxybenzene) and from 0.9 mol to 1.7 mols of formaldehyde in a closed reaction vessel under reflux conditions for at least one hour, the reaction being catalyzed by an alkaline catalyst such as ammonia, calcium hydroxide, calcium oxide, sodium hydroxide, lithium hydroxide, and other well known alkaline catalysts. The alkaline catalyst is employed in an amount of up to about 5% by weight based on the weight of phenol. The reaction product is subsequently vacuum dehydrated at a temperature not exceeding about 100° C. whereby substantially all the water is removed therefrom.

*Example II*

The following is an example of the preparation of a preferred thermosettable resin that may be employed in admixture with epoxy resin (b) in carrying out this invention.

Into a steam heated reaction vessel there are introduced the following:

|  | Pounds |
|---|---|
| Phenol (hydroxybenzene) _____(11.74 mols)__ | 1104 |
| Formaldehyde (37%) _____(12.82 mols)__ | 1040 |
| Ammonia (28%) _____ | 30 |

These materials are reacted in the steam heated reaction vessel at atmospheric pressure and at the boiling point (from about 95° C. to 100° C.) for a period of about 1½ hours. The mixture is then vacuum dehydrated under a vacuum of about 28 inches of mercury with the application of external heat. The vacuum is gradually increased to about 28 inches of mercury and when the temperature reaches 120° C. the dehydration is stopped. Substantially all water is removed. The resin is cooled to room temperature and about 690 pounds of ethanol are added to provide a resinous varnish composition. The resulting phenolic resin varnish composition has a specific gravity at 25° C. of from 1.055 to 1.070, a viscosity at 25° C. of from 250 to 500 centipoises, a set time of 13 to 16.5 minutes at 153° C. and a recoverable solids content of from 51% to 54%.

The glycidyl polyethers, also known as epoxy or epoxide resins employed as component (b) in producing the resinous composition above can be prepared by reacting predetermined amounts of at least one polyhydric phenol and at least one epihalohydrin in an alkaline medium. Phenols which are suitable for use in preparing such resinous polymeric epoxides include those that contain at least two phenolic hydroxy groups per molecule. Polynuclear phenols which have been found to be particularly suitable include those wherein the phenol nuclei are joined by carbon bridges, such, for example, as 4,4'-dihydroxy-diphenyl-dimethyl-methane (referred to as bisphenol "A") and 4,4'-dihydroxy-diphenyl-methane. In admixture with the named polynuclear phenols use also may be made of those polynuclear phenols wherein phenol nuclei are joined by sulfur bridges such, for example, as 4,4'-dihydroxy-diphenyl-sulfone.

While it is preferred to use epichlorohydrin as the epihalohydrin in the preparation of the resinous polymeric epoxide of the present invention, other epihalohydrins, for example, epibromohydrin can be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide suitable for use in this invention has a 1,2-epoxy equivalency greater than 1.0. By epoxy equivalency, reference is made to the number of 1,2-epoxy groups contained in the average molecule of the glycidyl ether.

Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is the value greater than 1.0. The 1,2-epoxy equivalency of the polyethers thus is a value between 1.0 and 2.0. In some cases, the epoxy equivalency is given in terms of epoxide equivalents in 100 grams of the resin, and this may vary from about 0.03 to 0.80. Also, epoxide equivalent is often expressed in the number of grams of resin containing 1 equivalent of epoxide, and will range from about 130 to about 3300.

Resinous polymeric epoxides or glycidyl polyethers suitable for use in accordance with this invention may be prepared by admixing and reacting from 1 mol to 2 mol proportions of epihalohydrin, preferably epichlorohydrin, with about 1 mol proportion of bisphenol "A" in the presence of at least a stoichiometric excess of alkali based on the amount of halogen.

To prepare the resinous polymeric epoxides, aqueous alkali, bisphenol "A" and epichlorohydrin are introduced into and admixed in a reaction vessel. The aqueous alkali serves to dissolve the bisphenol "A" with the formation of the alkali salts thereof. If desired, the aqueous alkali and bisphenol "A" can be admixed first and then the epichlorohydrin added thereto, or an aqueous solution of alkali and bisphenol "A" can be added to the epichlorohydrin. In any case, the mixture is heated in the vessel to a temperature within the range of about 80° C. to 110° C. for a period of time varying from about ½ hour to 3 hours, or more, depending upon the quantities of reactants employed.

Upon completion of heating, the reaction mixture separates into layers. The upper aqueous layer is withdrawn and discarded, and the lower layer is washed with hot water to remove unreacted alkali and halogen salt, in this case sodium chloride. If desired, dilute acids, for example, acetic acid or hydrochloric acid, can be employed during the washing procedure to neutralize the excess alkali. The resulting epoxy resins are either liquid or solid at room temperature.

Various epoxy resins have given good results. Thus, the following may be used with success.

*Example III*

An epoxide resin which has a melting point of 8–12° C., an epoxide equivalency of 190 to 210, and a viscosity of about Z5 on the Gardner-Holdt scale. This resin is available commercially as Epon 828.

*Example IV*

An epoxide resin having a melting point of 64–67° C., an epoxide equivalency of 450 to 525, and a 40% solution in butyl Carbitol has a viscosity of C–G on the Gardner-Holdt scale. This resin is commercially available as Epon 1001.

*Example V*

An epoxide resin which has a melting point of 97–103° C., an epoxide equivalency of 905 to 985, and a 40% solution in butyl Carbitol has a viscosity of R–T on the Gardner-Holdt scale. This resin is available commercially as Epon 1004.

*Example VI*

An epoxide resin which has a specific gravity (23° C./23° C.) of from 1.16 to 1.18, an epoxy value of from 0.440 to 0.480 epoxide equivalence per 100 grams of resin, and a viscosity of Z–6 on the Gardner-Holdt scale. This resin is available commercially as Araldite 6020.

The following example is illustrative of the preparation of the resinous varnish composition employed as the impregnant for the fibrous sheet material employed as the inner layer of the composite tubular member of this invention.

*Example VII*

To 100 parts by weight of the phenolic resin varnish of the Example II, there are added 4.4 parts by weight, of the epoxy resin of Example III. The epoxy resin is heated to about 80° F. prior to addition to the phenolic resin varnish to accelerate thorough admixing of the two components. The components are thoroughly admixed. The resulting resin varnish composition has a specific gravity at 25° C. of 1.063 to 1.088, a viscosity at 25° C. of from 300 to 550 centipoises, a set time at 153° C. of from 14 to 18.5, a pH at 25° C. of from 7.6 to 8.1 and a recoverable solids content of about 55%.

The outer layer or surface layer, of the composite tubular member of this invention is prepared from fibrous sheet material, preferably 3.5 mil kraft paper because it is relatively inexpensive and has high strength properties, which has been impregnated to a resin ratio of from about 2.30 to 2.40 with a specific phenolic resin to be detailed hereinafter. Impregnation of the kraft paper is accomplished in the manner described hereinbefore. The heat treatment which is employed to remove the volatile solvent from the treated paper is carried out in a suitable oven such, for example, as that employed in removing the solvent from the treated fibrous sheet material as hereinbefore described so as to provide the treated sheet of kraft paper with a greenness of about 12% to 17%. Greenness is determined as hereinbefore set forth. The outer layer can be prepared from other fibrous sheet material if desired. Examples of such material are alpha-cellulose paper, cotton fabric, asbestos paper, glass cloth, and fabrics prepared from synthetic fibers.

The specific phenolic resin composition that is employed as an impregnant for the kraft paper sheeting for use as the outer layer of the composite tube is a thermosettable phenolic resin composition comprising a thermoplastic phenol-formaldehyde novolak resin, the preparation of which will be detailed hereinafter, and 2,4,6-trimethylolphenol, the 2,4,6-trimethylolphenol acts as a curing or a cross linking agent for the phenolformaldehyde novolak resin, and is employed in an amount of from about 20% to 35%, based on the weight of the thermoplastic phenol-formaldehyde novolak resin. The thermoplastic phenol-formaldehyde novolak resin and the 2,4,6-trimethylolphenol are dissolved in a suitable solvent to provide a resinous impregnating varnish composition having a resin solids content of from about 50% to 65% by weight. Suitable solvents are methanol, ethanol, acetone, benzene, toluol, xylol and mixtures of two or more.

The phenol-formaldehyde novolak resin is prepared by reacting one mol of phenol and 0.5 mol to 0.85 mol of formaldehyde or a polymer of formaldehyde in a closed reaction vessel equipped with a stirrer, reflux column and a heater, at atmosphereic pressures and at the boiling point (about 95° C. to 100° C.) for a period of time of from about 15 minutes to 60 minutes. The reaction is catalyzed by a mineral acid such, for example, as sulfuric acid, hydrochloric acid, or phosphoric acid in an amount of from about 0.1% to 0.4% by weight, based on the weight of the phenol. The reaction mass is then neutralized by admixing therewith a suitable alkaline catalyst in an amount sufficient to provide a pH of from about 7 to 8. Suitable alkaline catalysts include ammonia hydroxide; the alkali metal oxides and hydroxides such as sodium hydroxide and potassium hydroxide; alkaline earth metal oxides and hydroxides such as calcium oxide, calcium hydroxide and barium hydroxide, and the like. After the addition of the alkali, reflux is continued at atmospheric pressure for a period of time of from about 1 hour to 2 hours. The reaction product is then vacuum dehydrated under a vacuum of at least 26 inches of mercury until substantially all the water is removed. The phenol-formaldehyde resin thus produced is dissolved in a suitable solvent in an amount to provide a varnish composition having a resin solids content of from about 50% to 65%. The desired amount of 2,4,6-trimethylolphenol is then added to the varnish composition to provide a phenolic resin varnish composition that is potentially thermosettable.

The 2,4,6-trimethylolphenol can be added in dry powder form if desired; however, it is preferred to first dissolve the desired amount in a suitable solvent, such for example, as water or ethanol, or mixtures thereof and to then add the resulting solution to the varnish composition. This method insures thorough and adequate admixing of the 2,4,6-trimethylolphenol with the novolak resin. A suitable 2,4,6-trimethylolphenol solution is one that consists of, by weight, 58% solid 2,4,6-trimethylolphenol and the balance, distilled water.

The following specific example is illustrative of the preparation of a thermoplastic phenol-formaldehyde novolak resin for use in this invention.

*Example VII*

The following ingredients are charged into a reaction vessel fitted with reflux column and stirrer and external heating means:

Phenol (hydroxybenzene) _____pounds__ 1200
Formaldehyde (37%) _____do____ 750
Sulfuric acid (98%) _____grams__ 600

The mixture is heated to reflux at atmospheric pressure and refluxed for a period of time of about 30 minutes. Reflux temperature is from about 95° to 100° C. The reaction product is cooled to a temperature of about 63° C. and a solution consisting of 10.1 pounds of 28% of ammonia and 40.4 pounds of water are added to the reaction product. These materials are mixed thoroughly and again heated to reflux and refluxed for an additional time of 60 minutes. Substantially all of the water is removed from the reaction mixture by vacuum dehydrating the mixture under a vacuum of about 20 inches of mercury. The phenol-formaldehyde novolak resin is then cooled to room temperature.

The following examples illustrate the preparation of the potentially thermosettable phenol-formaldehyde varnish composition that is employed in this invention.

*Example VIII*

Ethanol is added to a resin prepared in accordance with Example VII in an amount sufficient to provide a varnish having a 65% resinous solids content. To 100 parts by weight of the varnish thus prepared there are added about 40 parts by weight of a 58% aqueous solution of 2,4,6-trimethylolphenol to provide a potentially thermosettable phenol formaldehyde resinous varnish composition having a solids content of about 67%. The varnish has a viscosity of about 700–1800 centipoises at 25° C., a specific gravity of from about 1.120 to 1.180 at 25° C., a pH of about 7.5, and a set time at 153° C. of from about 12 to 15 minutes.

In preparing the composite tubular member of this invention, the inner layer is first formed by applying to a heated mandrel one wrapping of the impregnated identification sheet. One more wrapping of an impregnated identification sheet, preferably without any printing or lettering thereon, can be applied if desired. It is recommended that not more than two wrappings of the plasticized melamine-aldehyde impregnated sheets be applied to form the inner layer. Additional wrappings usually result in crazing or cracking of the layer when subjected to heat. The inner or barrier layer is next formed by the application to the thus formed inner layer of a plurality of wrappings of the fibrous sheet material impregnated with the specific phenolic-epoxy resinous composition, followed by a plurality of wrappings of the kraft paper impregnated with the specific thermosettable phenolic composition hereinbefore described to provide the outer layer of the tube. The mandrel with the applied inner layer, intermediate layer or barrier layer, and outer layer or surface layer, is placed in an oven and heated to a temperature of from about 140° C. to 160° C., or higher, if desired, for a period of time of from about 30 minutes to several hours, depending on the temperature, the thickness of the tubing on the mandrel, and other factors, to cure the B-stage resins, harden them into the final infusible and insoluble C-stage and to unite all the several wrappings or plies of the three layers of the composite laminated tubular members into a high density, unitary structure, impregnated throughout with resin. Thereafter the mandrel is removed by withdrawing the mandrel through a close fitting collar. Except for sanding and machining to size and desired surface finish there will be little further processing required in order to produce the composite laminated tubular member.

Referring to FIG. 3 of the drawing, there is illustrated schematically one stage of the process of preparing the composite tubular member in this invention. This one stage illustrates the application of the plasticized melamine-aldehyde impregnated sheets hereinabove described to a mandrel. The other sheets of material employed to provide the various layers of the composite laminated tubular member are applied subsequently to the previously applied sheets. The treated fibrous sheet material 32 is rolled on a steel mandrel 48, preferably a solid mandrel. The surface of the mandrel 48 is initially provided with a coating of a lubricant or other parting medium to enable the ultimately formed tubing to be separated readily therefrom. As illustrated, the sheet 32 is wrapped around the mandrel so that the surface layer of the resin 42 of the sheet of paper is inwardly disposed in rolling the sheet of paper 32 on a mandrel 48. As much tension and pressure should be applied as is possible without tearing the paper. Pressure of from about 8 pounds per lineal inch has been found to be satisfactory for 3.5 mil kraft paper, and for 5 mil sulphite paper. As shown in FIG. 3 of the drawing, the sheet material is, prior to wrapping onto the mandrel 48, passed between two rolls 50 and 52 which are heated to a temperature from about 130° C. to 150° C. to fuse the B-stage resin just immediately prior to its application to the mandrel. The applied wrappings will bond to each other by the fused layer 42. The other applied sheets are heated in like manner prior to their application to the previously applied layer. The mandrel with the applied wrappings is then placed in an oven and heated to cure the resins to the C-stage. The mandrel is removed. The fully cured composite laminated tubular member 60 is illustrated in FIG. 4 of the drawing.

The inner layer of the composite tubular member of this invention serves as an identification portion thereof. The intermediate or barrier layer of the composite tube serves to prevent the resins comprising the outer or surface layer of the composite tube from seeping through and discoloring the inner or identification layer of the tube prior to the final heat treatment above described. The outer or surface layer of the composite tubular member serves to provide the high strength required in the bobbin barrel.

*Example IX*

One wrapping of 3.5 mil bleached kraft paper that has been pigmented with titanium dioxide and impregnated to a resin ratio of about 2.10 and having a greenness of about 4% is wrapped around a mandrel which is heated to a temperature of about 150° C. Approximately 8 pounds of pressure per lineal inch is applied directly to the tube roll during rolling procedure. Two wrappings of 5 mil absorbent sulphite paper impregnated with the phenolic-epoxy resin composition of Example VII is next applied to the thus wrapped mandrel. This lay-up is then allowed to age for 30 minutes before applying the plurality of wrappings to produce the outside or outer layer thereto. This aging treatment is important in that a slight cure of the phenolic-epoxy resin impregnant occurs during this time and it is this slightly cured resin composition that prevents the resin from the subsequently applied outer layer from bleeding or seeping through to the inner layer and discoloring same.

Kraft paper of a thickness of 3.5 mils and impregnated with the resin of Example VIII to a resin ratio of about 2.30 and having a greenness of about 15% is then applied to the thus wrapped mandrel in a sufficient number of wrappings to provide a composite tubular member having a wall thickness of about 1/16 inch. The mandrel with the applied composite tubular member is placed in an oven and heated to a temperature of about 150° C. for a period of time or about two hours. The mandrel with the applied composite tubular member is removed from the oven and cooled to room temperature, and the tubular member stripped therefrom.

Tubular members prepared in accordance with Example VIII have been subjected to the high compressive forces of heat drawn nylon yarn without failure. The compressive force exerted by the nylon yarn varies from about 1500 to 2000 pounds per square inch.

Although the tubular members of this invention have particular application in the textile industry, they may also be employed for other applications requiring readily identifiable high strength tubular members.

It will be understood that the above description and drawing are illustrative of the invention and not in limitation thereof.

I claim as my invention:

1. A composite laminated tubular member comprising (1) an inner layer comprising at least one ply of decorated fibrous sheet material impregnated and bonded together by a thermoset plasticized melamine-aldehyde resin, (2) an intermediate layer comprising at least one ply of fibrous sheet material impregnated and bonded together by a thermoset resin composition comprising (a) from 98% to 88% by weight of a phenol-aldehyde resin and (b) from 2% to 12% by weight of a glycidyl polyether, and (3) an outer layer comprising a plurality of plies of fibrous sheet material impregnated and bonded together by a thermoset phenolic resin.

2. A composite laminated tubular member comprising (1) an inner layer comprising at least one ply of decorated pigmented paper sheeting impregnated and bonded together by a thermoset plasticized melamine-aldehyde resin, (2) an intermediate layer comprising at least one ply of paper sheeting impregnated and bonded together by a thermoset resin composition comprising (a) from 98% to 88% by weight of a phenol-aldehyde resin and (b) from 2% to 12% by weight of a glycidyl polyether and (3) an outer layer comprising a plurality of plies of kraft paper sheeting impregnated and bonded together by a thermoset phenolic resin, said thermoset phenolic resin being the heat-treated product of a resin composition comprising (i) a phenol-formaldehyde novolak resin and (ii) from about 20% to 35% by weight, based on the weight of the phenol-formaldehyde novolak resin of 2,4,6-trimethylolphenol.

References Cited in the file of this patent
UNITED STATES PATENTS

| | | |
|---|---|---|
| 2,711,982 | Straka | June 28, 1955 |
| 2,795,241 | Caldwell et al. | June 11, 1957 |
| 2,801,198 | Morris et al. | July 30, 1957 |
| 2,857,932 | Calderwood | Oct. 28, 1958 |
| 2,945,638 | Crawford | July 19, 1960 |
| 2,976,889 | Cannady | Mar. 28, 1961 |